United States Patent [19]
Yamaguchi

[11] Patent Number: 5,987,575
[45] Date of Patent: Nov. 16, 1999

[54] BACKUP METHOD AND APPARATUS ALLOWING ONLY REPLACED DATA TO BE TRANSFERRED

[75] Inventor: Masami Yamaguchi, Kawasaki, Japan

[73] Assignee: Fujitsu Limited, Kanagawa, Japan

[21] Appl. No.: 08/521,398

[22] Filed: Aug. 29, 1995

[30] Foreign Application Priority Data

Aug. 29, 1994 [JP] Japan .................................. 6-203147

[51] Int. Cl.⁶ ............................ G06F 12/16; G06F 11/20
[52] U.S. Cl. ........................ 711/162; 707/203; 707/204; 714/6
[58] Field of Search ..................................... 395/489, 181, 395/182.02, 182.04, 182.05, 182.08, 182.11, 600, 182.13, 182.14, 712, 619, 620; 711/162; 714/6; 707/204, 203

[56] References Cited

U.S. PATENT DOCUMENTS

| | | | |
|---|---|---|---|
| 5,043,871 | 8/1991 | Nishigaki et al. ....................... | 395/600 |
| 5,226,154 | 7/1993 | Kondoh .................................... | 395/620 |
| 5,263,154 | 11/1993 | Eastridge et al. .................. | 395/182.04 |
| 5,278,979 | 1/1994 | Foster et al. ............................. | 395/600 |
| 5,317,729 | 5/1994 | Makherjee et al. ...................... | 395/600 |
| 5,404,508 | 4/1995 | Konrad et al. .......................... | 395/618 |
| 5,479,654 | 12/1995 | Squibb .................................... | 395/617 |
| 5,493,728 | 2/1996 | Solton et al. ............................ | 395/250 |
| 5,504,801 | 4/1996 | Moser et al. .............................. | 375/29 |
| 5,544,347 | 8/1996 | Yanai et al. ............................. | 711/162 |
| 5,548,750 | 8/1996 | Larsson et al. .......................... | 395/600 |
| 5,574,906 | 11/1996 | Morris ..................................... | 395/601 |
| 5,586,247 | 12/1996 | Yoshifuji et al. ........................ | 385/181 |
| 5,588,143 | 12/1996 | Stupek, Jr. et al. ..................... | 395/500 |
| 5,600,834 | 2/1997 | Howard ................................... | 395/617 |
| 5,745,905 | 4/1998 | Larsson et al. .......................... | 707/203 |

OTHER PUBLICATIONS

The Norton Desktop for Windows, The Complete File Management and Utilities Solution for Every Windows User, Using Norton Backup for Windows Version 2, Symantec Corp., pp. 2–1 thru 4–7 and 8–1 thru 8–12, 1993.

*Primary Examiner*—Eddie P. Chan
*Assistant Examiner*—Hong Kim
*Attorney, Agent, or Firm*—Helfgott & Karas, P.C.

[57] ABSTRACT

A data backup apparatus determines whether a version serial number of data backed up in a network management system matches a version serial number of data stored in a data version serial number management field of an update history management area, upon having the network management system back up update data generated in a data processing apparatus. Upon a match of the version serial numbers of respective data, the data processing apparatus transfers only update data stored in the data update history management area via a communications link to the network management system. Upon a mismatch of the version serial numbers of respective data, the data processing apparatus transfers all data, including data other than update data, stored in an EEPROM of the data processing apparatus, to the network management system.

2 Claims, 10 Drawing Sheets

BACKUP METHOD AND APPARATUS ALLOWING ONLY REPLACED DATA TO BE TRANSFERRED

BACKGROUND OF THE INVENTION

1. Field of the Invention

This invention relates to a data backup method for having a data storage apparatus back up data stored in a data processing apparatus by transferring them via a communications link and to the data processing apparatus using the data backup method.

2. Description of the Related Arts

An increase in the processing capabilities of a data processing apparatus has produced an increase in a data volume processed by one or more data processing apparatuses and thus an increase in importance of a data backup. Especially, a system comprising a plurality of data processing apparatuses connected to a network may cause the entire network to shut down, unless data lost due to a fault in the data processing apparatus or the network are restored expeditiously. Thus, a network provides a data storage apparatus for backing up the newest data to be retrieved immediately after a data loss due to a fault, thereby preventing a system from shutting down.

To ensure the newest data are stored at all times for an expeditious retrieval, such a system connected to a network requires a data storage apparatus to store update data transferred from a data processing apparatus via a communications link. However, a data transfer from a data processing apparatus to a data storage apparatus upon every data change causes data backup times to occupy a large portion of an available window of a communications link, which is disadvantageous as evidenced by a lowered efficiency in utilizing a communications link.

SUMMARY OF THE INVENTION

This invention aims at enhancing efficiency in utilizing a communications link by shortening a data backup time.

This invention provides a data backup method of having a data processing apparatus transfer only replacement data to a data storage apparatus via a communications link, upon having the data storage apparatus back up data stored in the data processing apparatus. This data backup method greatly reduces a data transfer time, thereby enhancing efficiency in utilizing a communications link.

BRIEF DESCRIPTION OF THE DRAWINGS

One of an ordinary skill in the art can easily understand additional features and objects of this invention from the description of the preferred embodiments and the attached drawings.

In the drawings.

DESCRIPTION OF THE PREFERRED EMBODIMENT

Figure 1:
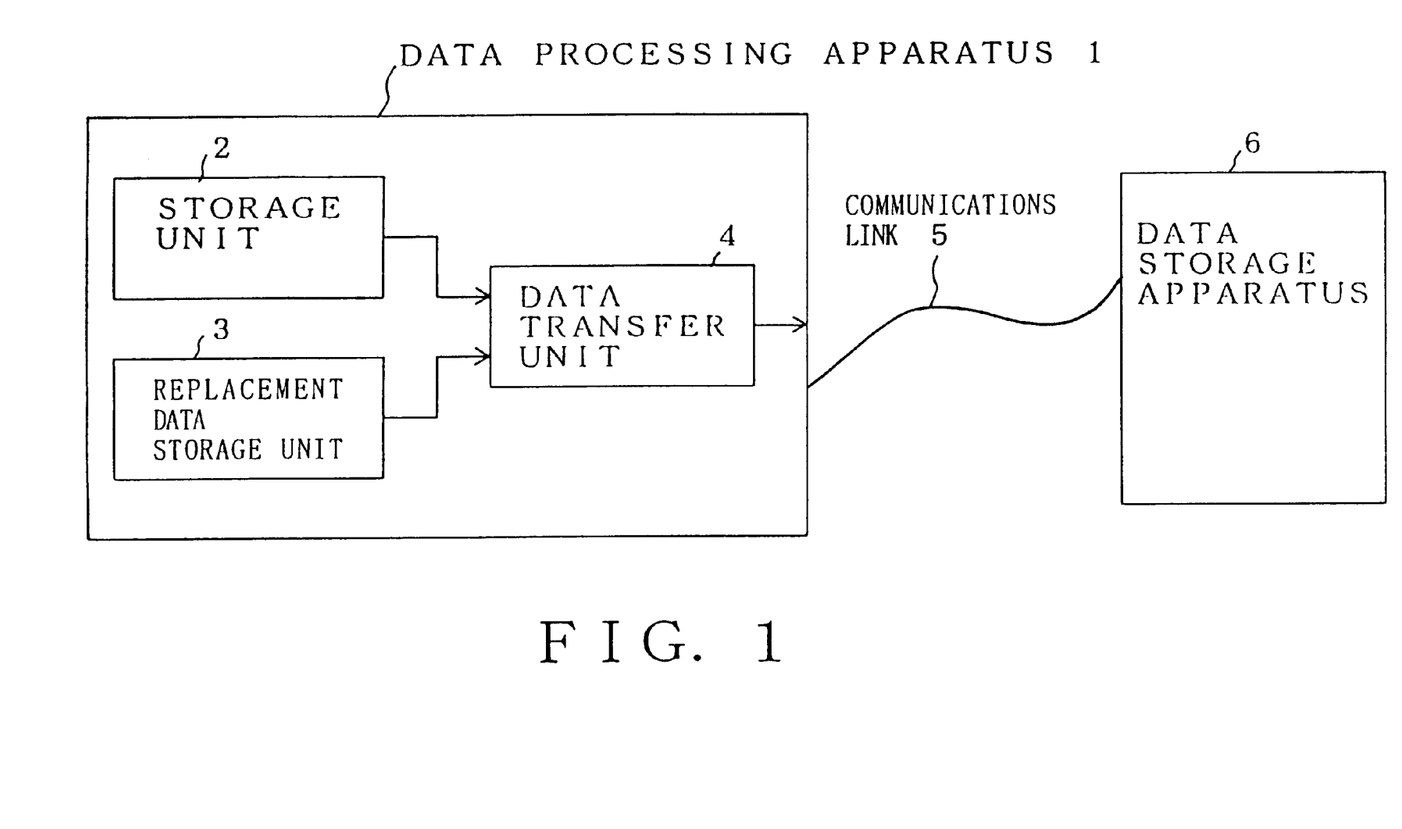
FIG. 1 is a block diagram illustrating an underlying principle of this invention.

FIG. 1 is a block diagram illustrating an underlying principle of this invention.

A data processing apparatus 1 comprises a storage unit 2 for storing data, a replacement data storage unit 3 for storing both replacement data and update history data, and a data transfer unit 4 for transferring the replacement data and the update history data via a communications link 5 to a data storage apparatus 6.

A data backup method of this invention is effective in enhancing efficiency in utilizing the communications link 5 by greatly reducing a data transfer time, because the data processing apparatus 1 transfers only replacement data and update history data, without any other unnecessary data, via the communications link 5 to the data storage apparatus 6, after storing them in the replacement data storage unit 3.

Figure 2:
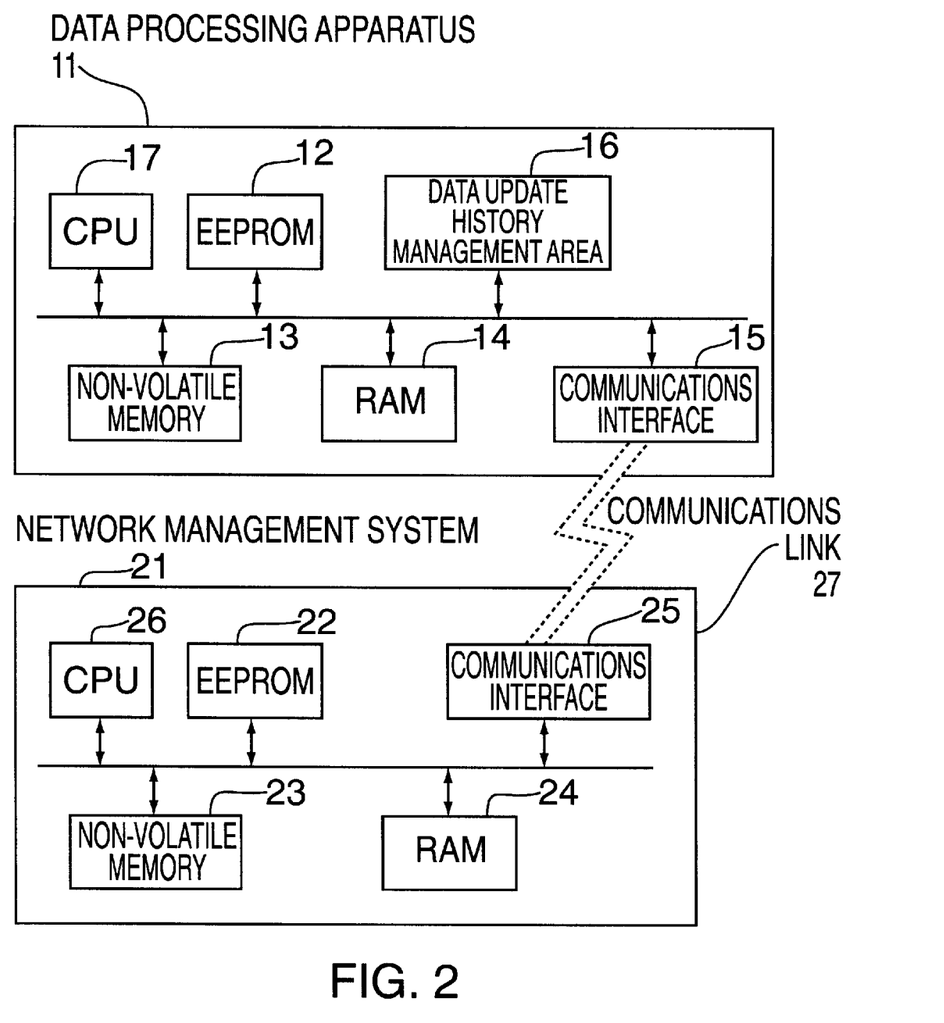
FIG. 2 is a block diagram illustrating the configuration of a system connected to a network.

FIG. 2 is a block diagram illustrating the configuration of a system connected to a network.

A data processing apparatus 11 for allowing a user to input and change data comprises an EEPROM 12 for storing new update data, a non-volatile memory 13, a RAM 14 for temporarily storing data, a communications interface 15, an update history data management area 16 for storing update data comprising replacement data and update history data, and a CPU 17 for controlling these components. The data update history management area 16 may be provided inside of non-volatile memory 13 or EEPROM 12.

An NMS (Network Management System) 21 for backing up data of the data processing apparatus 11 connected to a network comprises an EEPROM 22 for storing backup data, a non-volatile memory 23, a RAM 24, a communications interface 25 and a CPU 26 for controlling these components.

A communications link 27, for example, as well as a modem and an embedded operations channel, connects the data processing apparatus 11 to the NMS 21.

Figure 3:
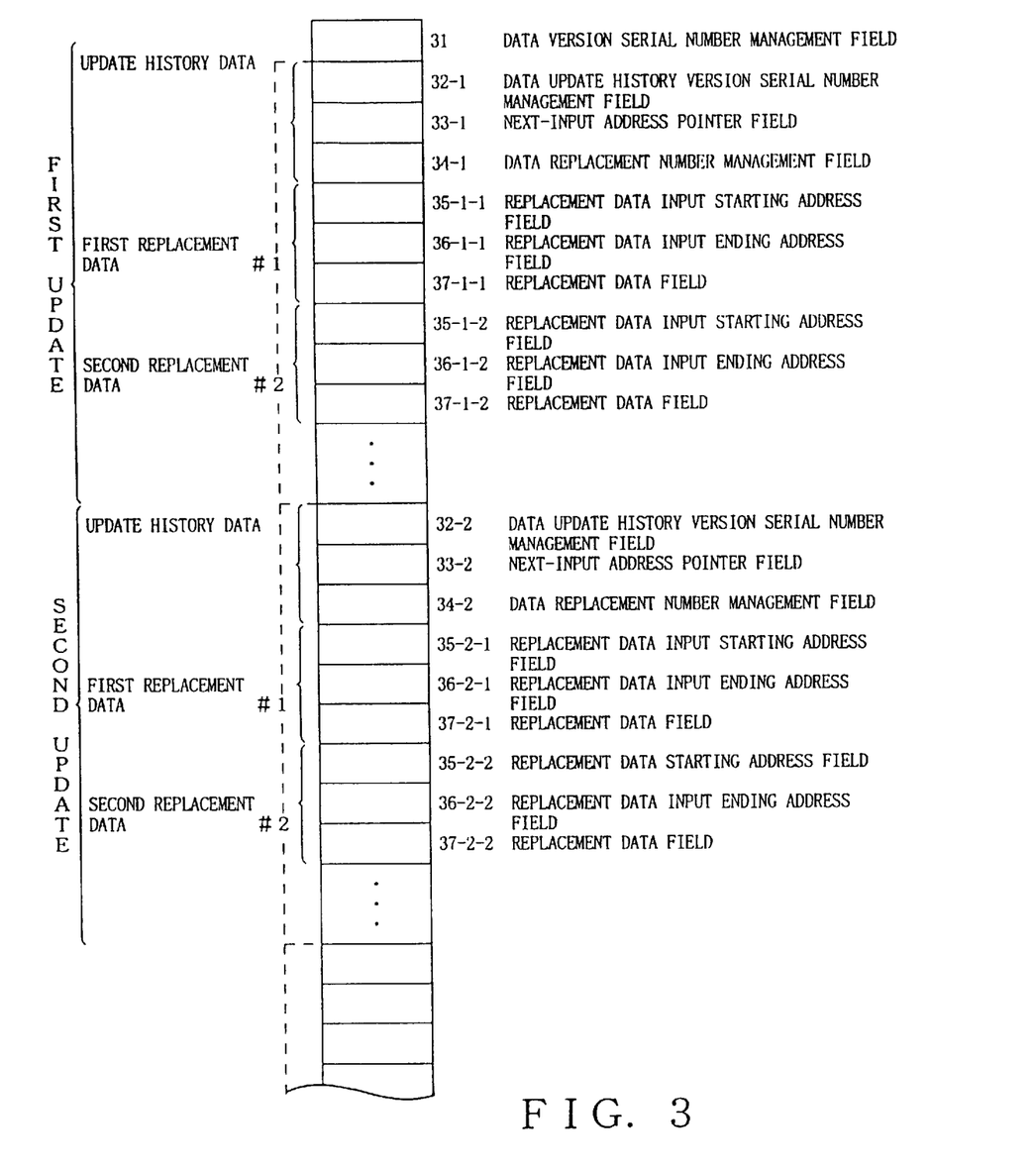
FIG. 3 is an explanatory chart illustrating the configuration of the data update history management area 16 shown in FIG. 2.

FIG. 3 is an explanatory chart illustrating the configuration of the data update history management area 16 shown in FIG. 2.

The data update history management area 16 (shown in FIG. 2) comprises a data version serial number management field 31 for storing a version serial number of data in the data update history management area 16.

A data update history version serial number management field 32-1 for storing a sub-version of the version, a next-input address pointer field 33-1 for storing the storage address of update history data of the next update data, a data replacement number management field 34-1 for storing the number of replacement data, a replacement data input starting address field 35-1-1 for storing a starting address at which EEPROM 12 (shown in FIG. 2) starts storing the first replacement data of the first update, a replacement data input ending address field 36-1-1 for storing an ending address at which EEPROM 12 ends storing the first replacement data of the first update, and a replacement data field 37-1-1 for storing actual replacement data in the first replacement data of the first update.

Accordingly, the data update history management area 16 comprises a replacement data input starting address field 35-1-2 for storing a starting address at which EEPROM 12 starts storing the second replacement data of the first update data, a replacement data input ending address field 36-1-2 for storing an ending address at which EEPROM 12 ends storing the second replacement data of the first update data, and a replacement data field 37-1-2 for storing actual replacement data in the second replacement data of the first update.

A subsequent subgroup of data fields for subsequent replacement data is constructed identically.

More additionally, the data update history management area 16 comprises a second group of data fields for second update, a third group of data fields for third update, and so forth.

Figure 4:
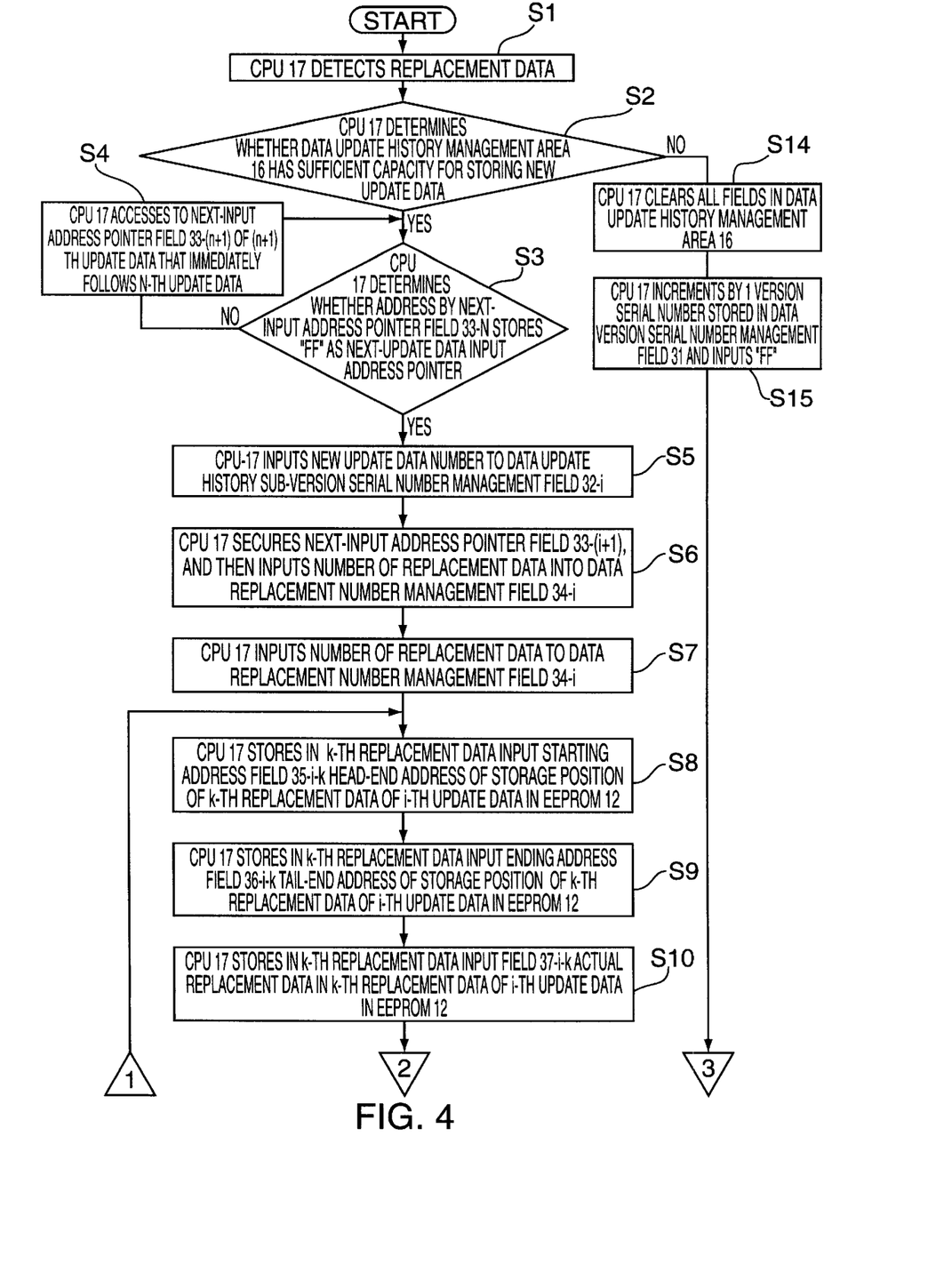
FIG. 4 is a first one of flowcharts illustrating in a two-part series a process for having CPU 17 shown in FIG. 2 store data updates in the data update history management area 16 shown in FIG. 2.

FIG. 4 is a first one of flowcharts illustrating in a two-part series a process for having CPU 17 shown in FIG. 2 store replacement data in the data update history management area 16 shown in FIG. 2.

S1: Upon a start of the process, CPU 17 (shown in FIG. 2) detects data updates. The process continues to step S2.

S2: CPU 17 determines whether or not the data update history management area 16 (shown in FIG. 2) has a sufficient capacity for storing all of new replacement data. Upon a positive determination (YES), the process continues to step S3. Upon a negative determination (NO), the process continues to step S14. The negative determination of step S2 corresponds to part (a) of FIG. 9.

S3: CPU 17 determines whether or not the address specified by a next-input address pointer field 33-1 (shown in FIG. 3) stores "FF" as a next input address pointer. Upon a positive determination (YES), the process continues to step S5. Upon a negative determination (NO), the process continues to step S4.

S4: CPU 17 determines whether or not the address specified by a next-input address pointer field 33-2 stores "FF" as a next input address pointer.

The process loops back to step S3, thereby repeating steps S3 and S4 until CPU 17 detects a next-input address pointer field storing "FF" as a next input address pointer.

S5: CPU 17 inputs a new version number to a data update history version serial number management field 32-i (shown in FIG. 3). The process continues to step S6. This step corresponds to part (b) of FIG. 6 and part (i) of FIG. 8.

S6: CPU 17 secures a next-input address pointer field 33-(i+1), and then inputs the number of replacement data into a data replacement number management field 34-i. The process continues to step S7. Step S6 corresponds to part (c) of FIG. 6.

S7: CPU 17 inputs the number of replacement data to the data replacement number management field 34-i. The process continues to step S8. Step S7 corresponds to part (d) of FIG. 6.

S8: CPU 17 stores in a first replacement data input starting address field 35-i-1 the head-end address of a storage position of the first replacement data of the i-th update in EEPROM 12. The process continues to step S9. Step S8 corresponds to parts (e) and (f) of FIG. 7.

S9: CPU 17 stores in a first replacement data input ending address field 36-i-1 the tail-end address of a storage position of the first replacement data of the i-th update in EEPROM 12. The process continues to step S10. Step S9 corresponds to parts (e) and (f) of FIG. 7.

S10: CPU 17 stores in a first replacement data field 37-i-1 the first replacement data of the i-th update in EEPROM 12. The process continues to step S11 (shown in FIG. 11). Step S10 corresponds to parts (e) and (f) of FIG. 7.

Figure 5:
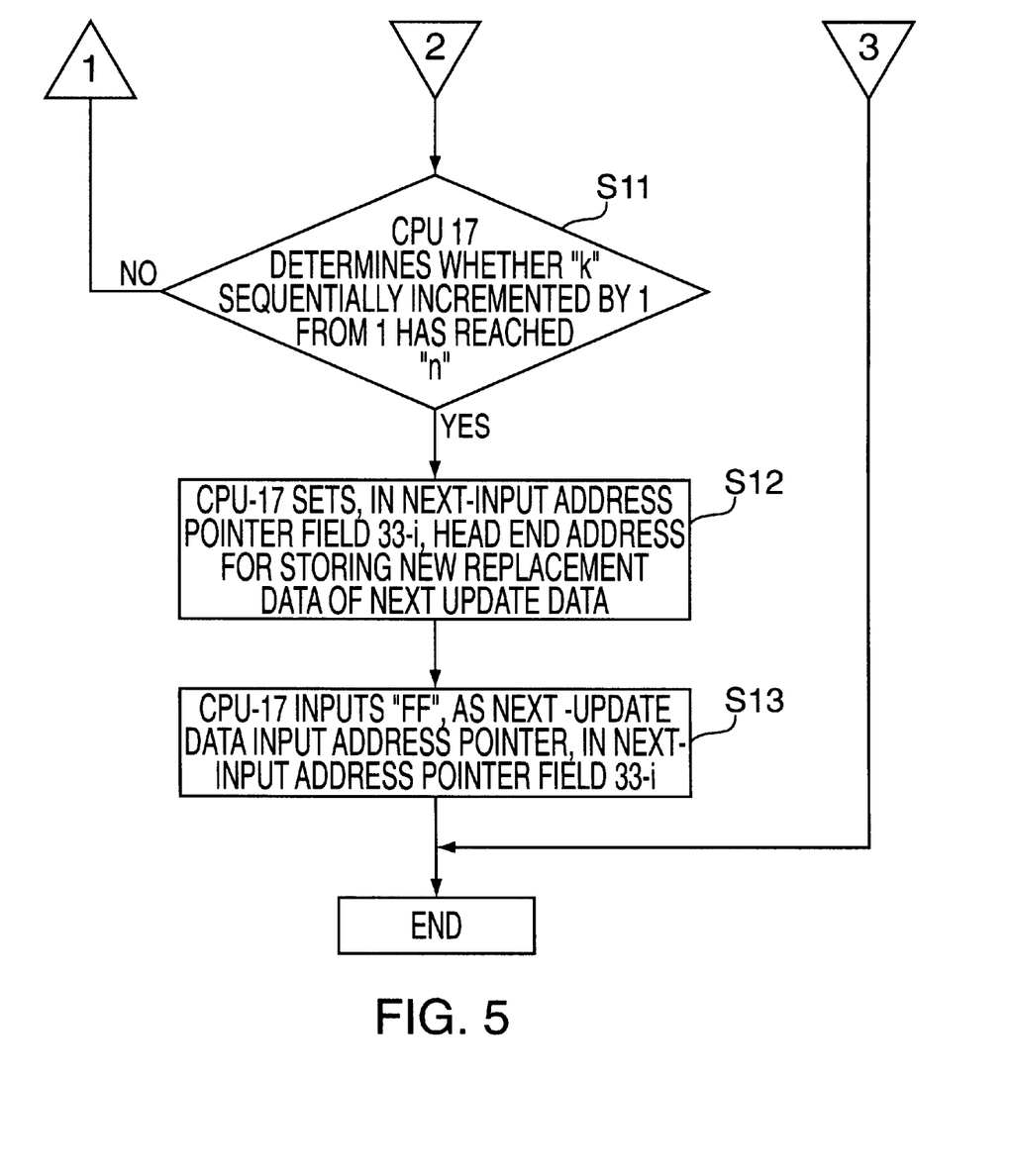
FIG. 5 is a second one of flowcharts illustrating in a two-part series a process for having CPU 17 shown in FIG. 2 store data updates in the data update history management area 16 shown in FIG. 2.

FIG. 5 is a second one of flowcharts illustrating in a two-part series a process for having CPU 17 shown in FIG. 2 store data updates in the data update history management area 16 shown in FIG. 2.

S11: CPU 17 determines whether or not the backup of all of replacement data of the i-th update has finished. Upon a positive determination (YES), the process continues to step S12. Upon a negative determination (NO), the process loops back to step S8 (shown in FIG. 4), thereby repeating steps S8 through S11. Step S11 corresponds to parts (e) and (f) of FIG. 7.

S12: CPU 17 sets, in the next-input address pointer field 33-i secured earlier, the address following that of a replacement data input field 37-i-n, as an address for storing new replacement data of the next update. Step S12 corresponds to part (g) of FIG. 8.

S13: CPU 17 inputs "FF", as a next input address pointer, in the address which is stored in next-input address pointer field 33-i, i.e. the address next to the last address of the memory area used in backing up the replacement data, thereby completing the process of storing replacement update data in the data update history management area 16. Step S13 corresponds to part (h) of FIG. 8.

The explanation continues by returning to FIG. 4.

S14: CPU 17 clears all fields in the data update history management area 16. The process continues to step S15. Step S14 corresponds to part (b) of FIG. 9.

S15: CPU 17 increments by one [1] the version serial number stored in the data version serial number management field 31 and inputs "FF", as a next input address pointer, in the next field, which is data update history version serial number management field 32-1, thereby completing the process of storing new replacement data in the data update history management area 16. Step S15 corresponds to part (a) of FIG. 6 and part (c) of FIG. 9.

The following is a description about changes in contents CPU 17 stores in the data update history management area 16 in the process of storing new replacement data as discussed above. In FIG. 6 through FIG. 9, a field shaded with oblique solid lines indicates one having already received its input, while a field shaded with horizontal dashed lines indicates one having been secured by next-input address pointer field 33-1 for receiving as its input an address for storing the next replacement data once it has been determined.

Figure 6:
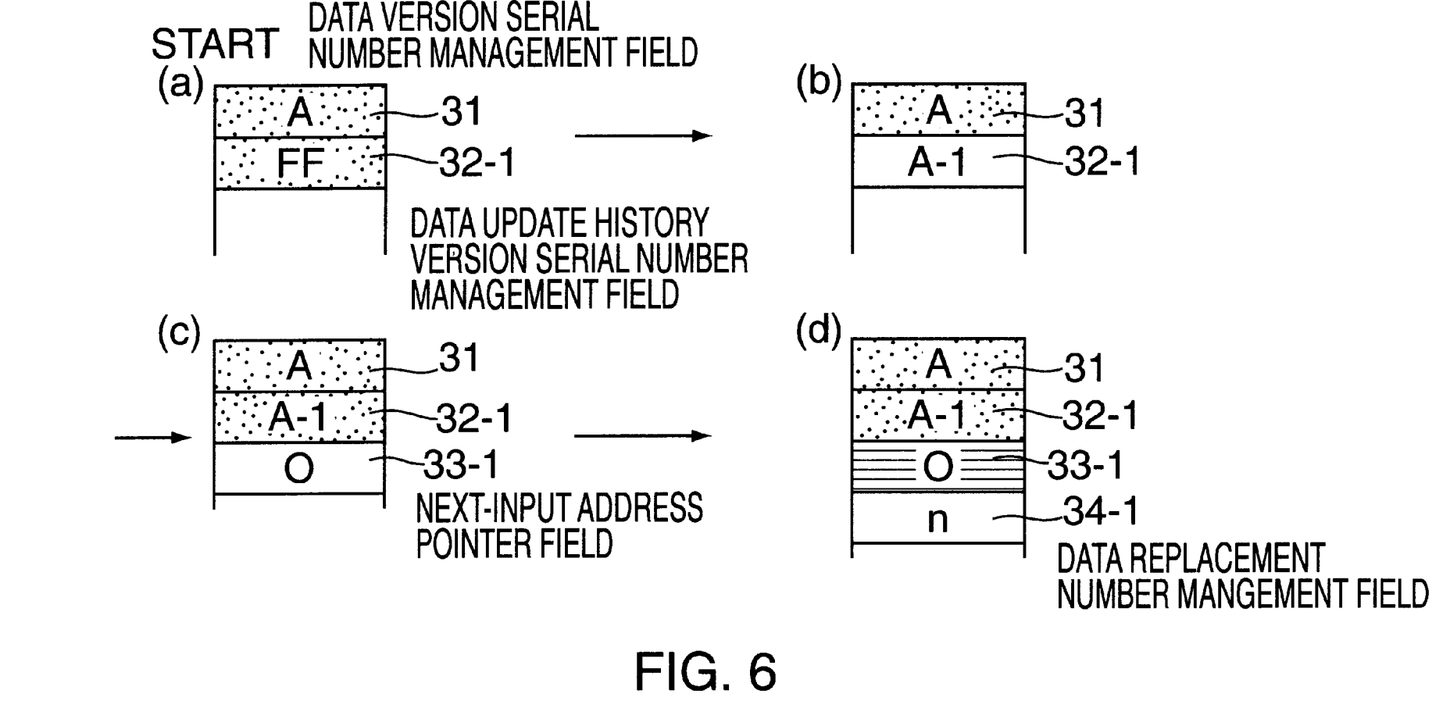
FIG. 6 is a first one of explanatory diagrams illustrating in a three-part series changes in contents in respective fields of the data update history management area 16 shown in FIG. 2, when it has a sufficient capacity for storing new update data.

FIG. 6 is a first one of explanatory diagrams illustrating in a three-part series changes in contents in respective fields of the data replacement history management area 16 shown in FIG. 2, when it has a sufficient capacity for storing new update data.

Part (a) illustrates a status in which CPU 17 sets "A", as a version serial number, in the data update data management field 31, after having cleared all fields in the data update history management area 16, and sets "FF", as a next input address pointer, in data update history version serial number management field 32-1 of the first replacement data, which is the field next to the data version serial number management field 31. Part (a) corresponds to the status after ending step S15 shown in FIG. 4.

Part (b) illustrates a status in which CPU 17 sets "A–1", as a new version serial number of the first replacement data in a version having version serial number "A", in data update history sub-version serial number management field 32-1, after it starts backing up the first replacement data. Part (b) corresponds to step S5 shown in FIG. 4.

Part (c) illustrates a status in which CPU 17 secures next-input address pointer field 33-1. Part (c) corresponds to step S6 shown in FIG. 4.

Part (d) illustrates a status in which CPU 17 sets "n", as the number of replacement data in the first update, in data replacement number management field 34-1. Part (d) corresponds to step S7 shown in FIG. 4.

Figure 7:
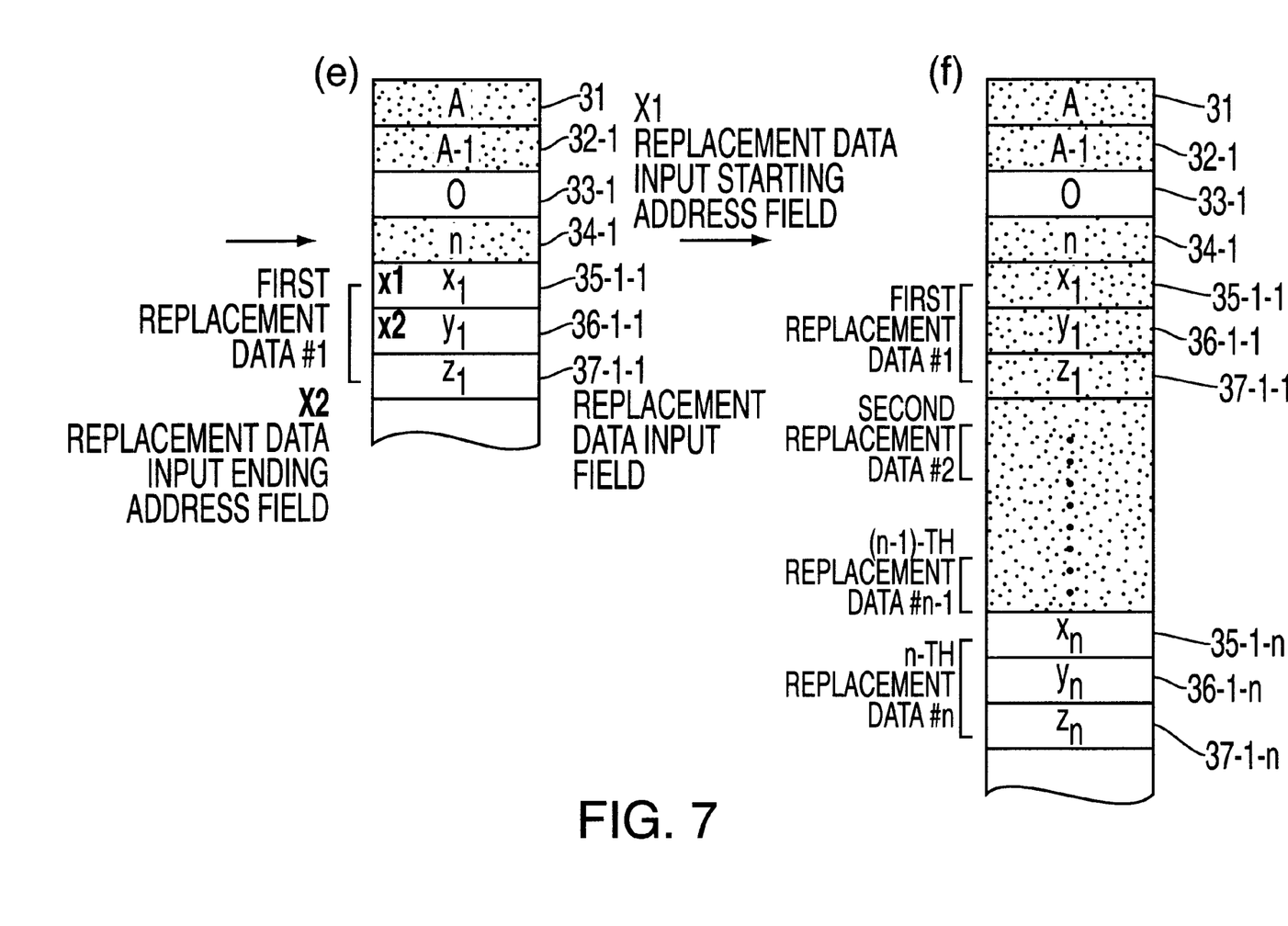
FIG. 7 is a second one of explanatory diagrams illustrating in a three-part series changes in contents in respective fields of the data update history management area 16 shown in FIG. 2, when it has a sufficient capacity for storing new update data.

FIG. 7 is a second one of explanatory diagrams illustrating in a three-part series changes in contents in respective fields of the data update history management area 16 shown in FIG. 2, when it has a sufficient capacity for storing new update data.

Part (e) illustrates a status in which CPU 17 sets "$x_1$", as the head-end address in EEPROM 12 for storing the first replacement data #1, in replacement data input starting address field 35-1-1; "$y_1$", as the tail-end address in EEPROM 12 for storing the first replacement data #1, in replacement data input ending address field 36-1-1; and "$z_1$", as actual replacement data in the first replacement data #1, in replacement data input field 37-1-1. Part (e) corresponds to steps S8, S9 and S10 shown in FIG. 4 and S11 shown in FIG. 5.

Part (f) illustrates a status in which CPU 17 finally sets "$x_n$", as the head-end address in EEPROM 12 for storing the n-th replacement data, in replacement data input starting address field 35-1-n; "$y_n$", as the tail-end address in EEPROM 12 for storing the n-th replacement data, in replacement data input ending address field 36-1-n; and "$z_n$", as actual replacement data in the n-th replacement data, in replacement data input field 37-1-n, after having set likewise "$x_k$", as the head-end address in EEPROM 12 for storing the k-th replacement data, in replacement data input starting address field 35-1-k; "$y_k$", as the tail-end address in EEPROM 12 for storing the k-th replacement data, in replacement data input ending address field 36-1-k; and "$z_k$", as actual replacement data in the k-th replacement data, in replacement data input field 37-1-k, where "k" is an integer between one [1] and "n", the number of replacement data in the first update data, which is set in data replacement number management field 34-1. Part (f) corresponds to steps S8, S9 and S10 shown in FIG. 4 and S11 shown in FIG. 5.

Figure 8:
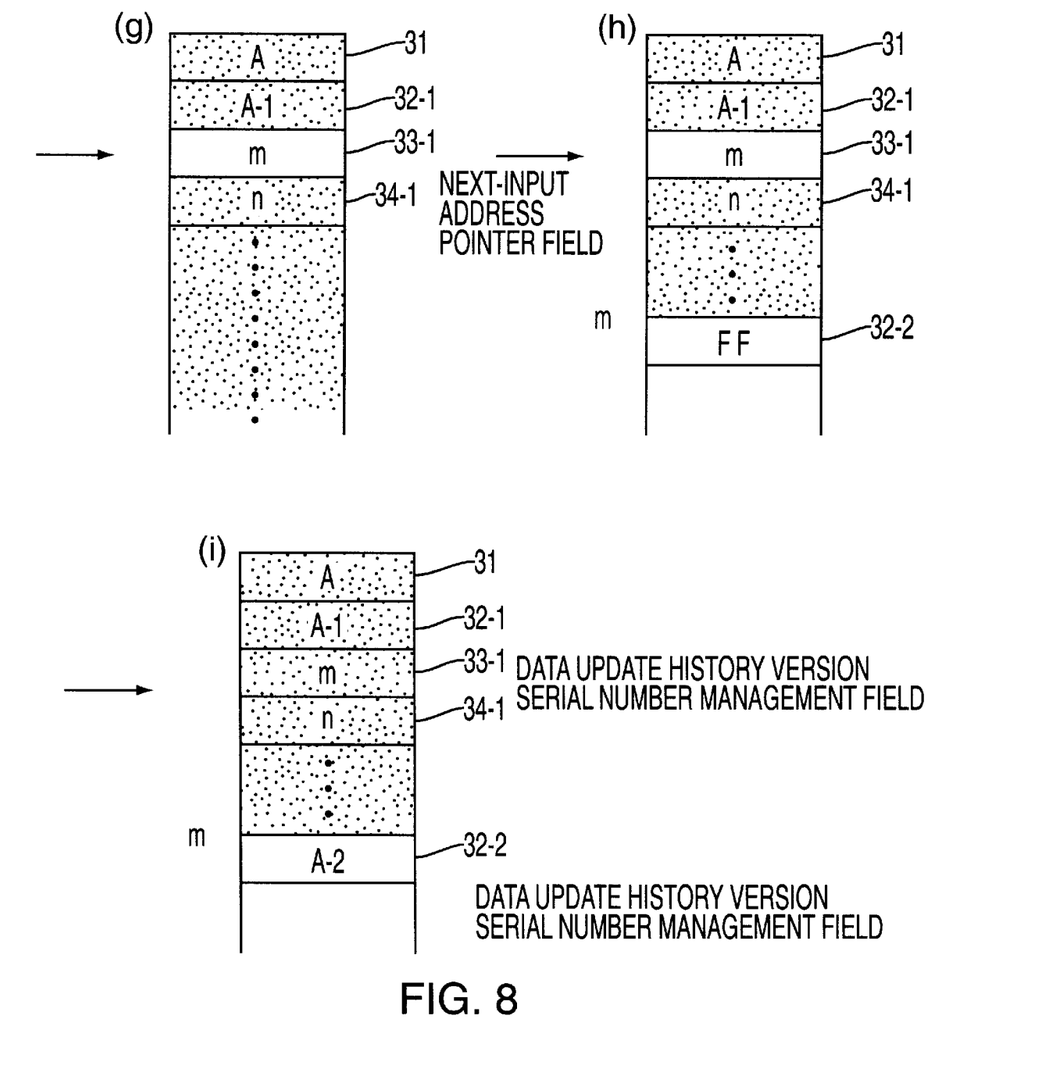
FIG. 8 is a third one of explanatory diagrams illustrating in a three-part series changes in contents in respective fields of the data update history management area 16 shown in FIG. 2, when it has a sufficient capacity for storing new update data.

FIG. 8 is a third one of explanatory diagrams illustrating in a three-part series changes in contents in respective fields of the data update history management area 16 shown in FIG. 2, when it has a sufficient capacity for storing new update data.

Part (g) illustrates a status in which CPU 17 sets "m", as the address in EEPROM 12 for storing data update history version serial number management field 32-2 of the next update (i.e. the second update), in next-input address pointer field 33-1, thereby completing a backup of the first update data in a version having version serial number "A". Part (g) corresponds to step S12 shown in FIG. 5.

Part (h) illustrates a status in which CPU 17 sets "FF" in data update history version serial number management field 32-2 of the second update, which corresponds to step "m" set in next-input address pointer field 33-1 of the first update. Part (h) corresponds to step S13 shown in FIG. 5.

Part (i) illustrates a status in which CPU 17 sets "A-2", as a version serial number of the second update in a version having version serial number "A", in data update history version serial number management field 32-2, after it starts backing up the second replacement data. Part (i) corresponds to step S5 shown in FIG. 4.

Then, CPU 17 similarly sets appropriate values in the subsequent fields (shown in FIG. 3) in the data update history management area 16.

Figure 9:
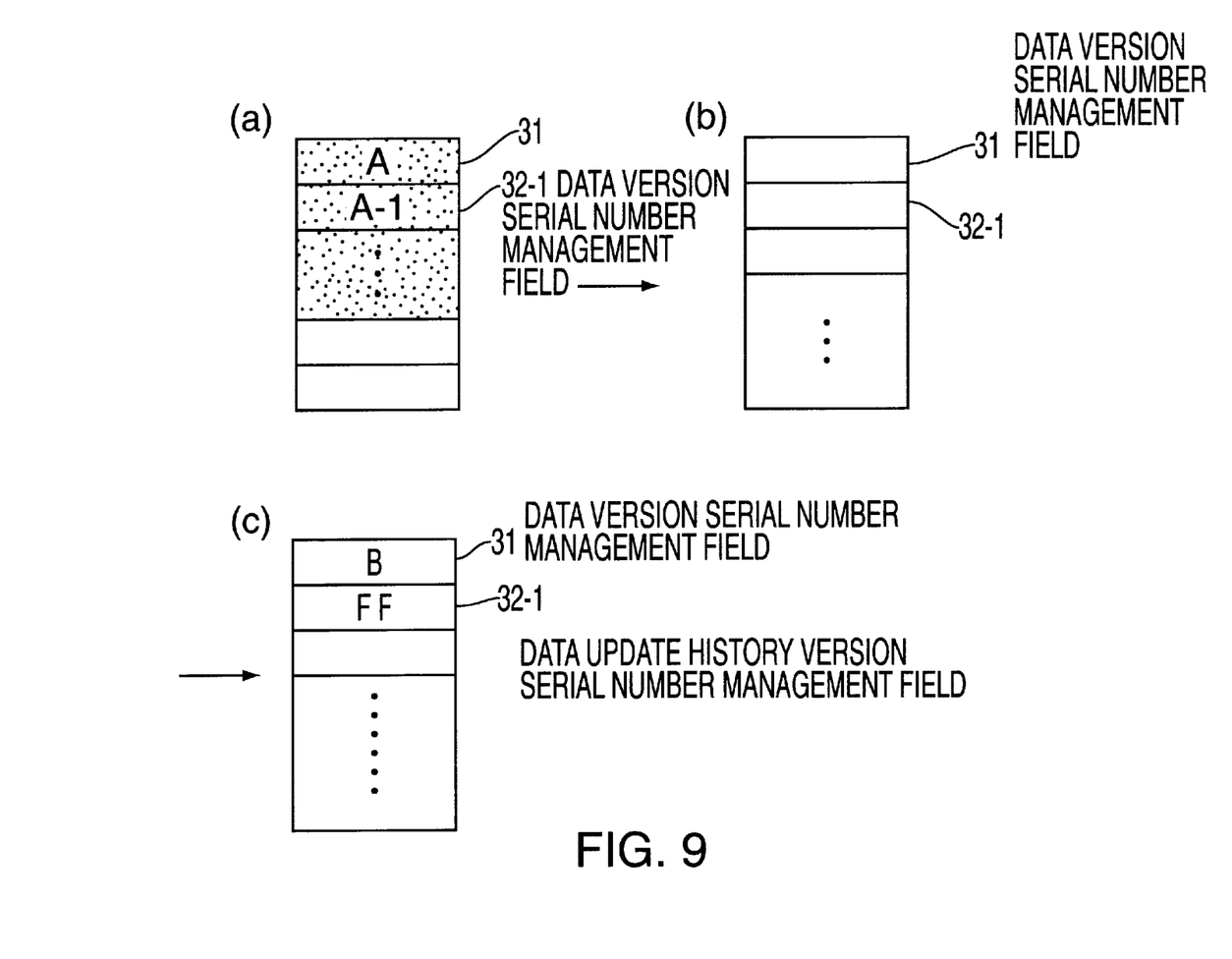
FIG. 9 is an explanatory diagram illustrating changes in contents in respective fields of the data update history management area 16 shown in FIG. 2, when it does not have a sufficient capacity for storing new update data.

FIG. 9 is an explanatory diagram illustrating changes in contents in respective fields of the data update history management area 16 shown in FIG. 2, when it does not have a sufficient capacity for storing new update data.

Part (a) illustrates a status in which CPU 17 (shown in FIG. 2) has used up all available fields in the data update history management area 16 for storing new replacement data in a version having version serial number "A". Part (a) corresponds to step a negative determination in S2 shown in FIG. 4.

Part (b) illustrates a status in which CPU 17 clears all fields in the data update history management area 16. Part (b) corresponds to step S14 shown in FIG. 4.

Part (c) illustrates a status in which CPU 17 sets "B", as a version serial number, in the data version serial number management field 31, and sets "FF", as an input address pointer for the next update, in data update history version serial number management field 32-1 of the first update, which is the field next to the data version serial number management field 31. Part (c) corresponds to step S15 shown in FIG. 4.

Figure 10:
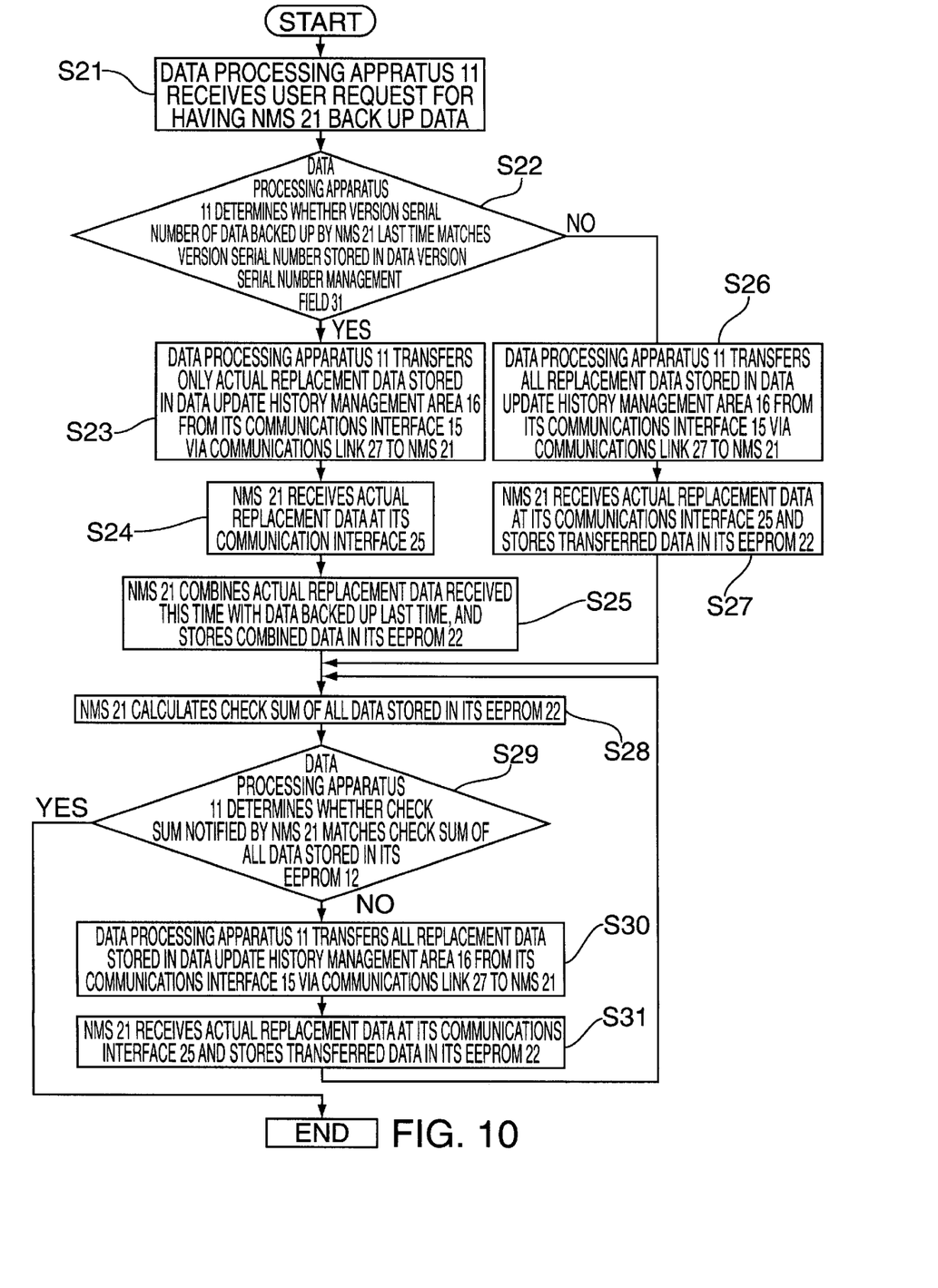
FIG. 10 is a flowchart illustrating a process for having the NMS (network management system) 21 shown in FIG. 2 back up data stored in the data processing apparatus 11 shown in FIG. 2.

FIG. 10 is a flowchart illustrating a process for having the NMS (network management system) 21 shown in FIG. 2 back up data stored in the data processing apparatus 11 shown in FIG. 2.

S21: Upon a start of the process, the data processing apparatus 11 receives a user request for having the NMS 21 back up data. The process continues to step S22.

S22: The data processing apparatus 11 determines whether or not the version serial number of data backed up by the NMS 21 the last time matches the version serial number stored in the data version serial number management field 31 (shown in FIG. 3) of the data update history management area 16 (shown in FIG. 2). Upon a positive determination (YES), the process continues to step S23. Upon a negative determination (NO), the process continues to step S26.

S23: The data processing apparatus 11 transfers only actual replacement data stored in the data update history management area 16 from its communications interface 15 via the communications link 27 to the NMS 21. The process continues to step S24.

S24: The NMS 21 receives the actual replacement data at its communications interface 25. The process continues to step S25.

S25: The NMS 21 combines the actual replacement data received this time with the data backed up the last time, and stores the combined data in its EEPROM 22.

The process continues to step S28.

S26: The data processing apparatus 11 transfers all replacement data stored in the data update history management area 16 from its communications interface 15 via the communications link 27 to the NMS 21. The process continues to step S27.

S27: The NMS 21 receives the actual replacement data at its communications interface 25 and stores the transferred data in its EEPROM 22. The process continues to step S28.

S28: The NMS 21 calculates a check sum of all the data stored in its EEPROM 22, which are obtained either as data combined in step S25 or as data transferred in step S27, and notifies the data processing apparatus 11 of the check sum. The process continues to step S29.

S29: The data processing apparatus 11 determines whether or not the check sum notified by the NMS 21 matches the check sum of all the data stored in its EEPROM 12. Upon a positive determination (YES), the process ends, thereby competing a data backup. Upon a negative determination (NO), the process continues to step S30.

S30: The data processing apparatus 11 transfers all replacement data stored in the data update history management area 16 from its communications interface 15 via the communications link 27 to the NMS 21. The process continues to step S27.

S31: The NMS 21 receives the actual replacement data at its communications interface 25 and stores the transferred data in its EEPROM 22. The process loops back to step S28.

As described above, a positive determination in step S22 enables the data processing apparatus 11 to transfer to the NMS 21 only actual replacement data, instead of all data as in the case of a negative determination in step S22. This is effective in greatly shortening a data transfer time and thus improving the efficiency in utilizing the communications link 27.

It is noted here that the above embodiment is constructed such that CPU 17 clears all fields in the data update history management area 16 and increments the version serial number stored in the data version serial number management field 31, when the data update history management area 16 has no available fields for storing new replacement data.

However, another embodiment may also be constructed such that the NMS 21 backs up all data stored in respective fields in the data update history management area 16, when the data update history management area 16 has no available fields for storing new replacement data, before CPU 17 clears all fields in the data update history management area 16 and increments the version serial number stored in the data version serial number management field 31. Because such an embodiment allows the version serial number backed up in the NMS 21 to always match the version serial number stored in the data update history management area 16, the data processing apparatus 11 need only transfer actual replacement data to the NMS 21 upon a data backup.

Although this invention has been described in its preferred forms with a certain degree of particularity, it is understood that the present disclosure of the preferred forms has been changed in details of construction and that the combination and arrangement of parts may be restored to without departing from the spirit and the scope of this invention as hereinafter claimed.

What is claimed is:

1. A data processing apparatus, comprising:

a storage means for storing data;

a data update storage means for storing replacement data and update history data; and a data transfer means for transferring via a communication link to a data storage apparatus said replacement data and said update history data stored in said data storage means, upon a next data backup;

said data update storage means stores a version serial number as update history data; and said data transfer means determines whether or not stores a version serial number of data backed up in said data storage apparatus matches the version serial number of data stored in said data update storage means, and transfers only replacement data of the same version serial number stored in said data update storage means to said data storage apparatus, upon a positive determination, and transfers for a data backup all update data stored in said data update storage means to said data storage apparatus, upon a negative determination.

2. A data backup-method for having a data storage apparatus backup data stored in a data processing apparatus via a communication link, comprising the steps of:

a step of storing update history data indicating an update history of the data;

a step of having said data storage apparatus store backup data and first update history data;

a step of having said data processing apparatus store replacement data and second update history data of a next data backup;

a step of having said data processing apparatus determine whether or not its update history data matches the first update history data of said data storage apparatus, upon the next data backup; and a step of having said data processing apparatus transfer to said data storage apparatus only replacement data since the last backup based on the second update history data upon the next data backup;

wherein invoked upon a positive determination in said determining step, of having said data processing apparatus transfer only said replacement data of the next data backup to said data storage apparatus; and wherein invoked upon a negative determination in said determining step, of having said data processing apparatus transfer all update data of the next data backup to said data storage apparatus.

* * * * *